Oct. 4, 1927.
T. GENTSCH
WEEDING TOOL
Filed Nov. 3, 1926
1,644,426
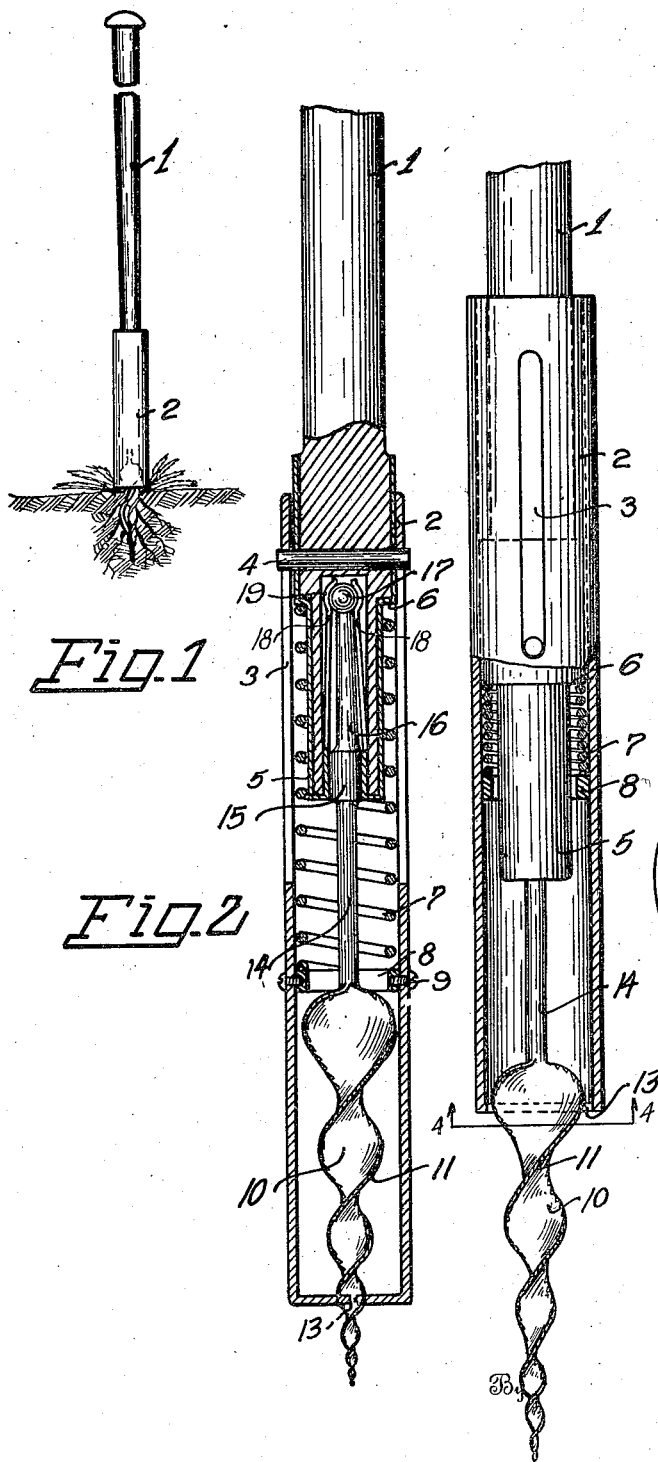
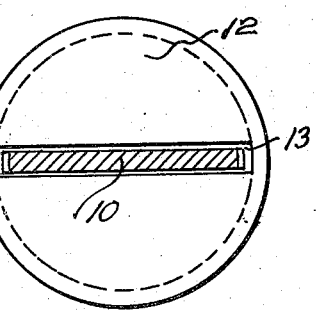
Inventor
Theodore Gentsch
Herbert E. Smith
Attorney Patented Oct. 4, 1927.

1,644,426

UNITED STATES PATENT OFFICE.

THEODORE GENTSCH, OF SPOKANE, WASHINGTON.

WEEDING TOOL.

Application filed November 3, 1926. Serial No. 146,055.

My present invention relates to improvements in weeding tools of the manually operated type and is designed for use in removing weeds from lawns and grass plots, and is particularly adapted for use in destroying and removing dandelions, plantains and other similar plants.

The tool or implement is provided with an auger and reciprocating means are provided for actuating the auger in tearing or cutting the plant and its roots from the ground.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a view in elevation showing the device or tool in operative position with the auger inserted in the ground and cutting or tearing the roots of a plant;

Fig. 2 is an enlarged detail vertical sectional view at the lower end of the tool showing the auger withdrawn within its casing or sleeve;

Fig. 3 is a view partly in section and partly in elevation as seen from the left in Fig. 2 with the auger in extended position; and Fig. 4 is an enlarged detail sectional view at 4—4 in Fig. 3 showing the guide slot for the auger.

In carrying out my invention as illustrated in the drawings, I utilize a wooden handle 1 of suitable length which is adapted to telescope or reciprocate in a tubular metallic extension or sleeve 2 at the lower end of the handle. This sleeve is fashioned with a pair of longitudinally extending slots 3 and the handle is provided with a transversely extending pin 4, the ends of which protrude through these slots, and the pin acts as a guide in the relative movement of the handle 1 and sleeve 2. On the end of the handle located within the sleeve a metallic head or ferrule 5 is attached and this ferrule is fashioned with an annular shoulder 6 within the sleeve and a spring 7 is interposed between the shoulder 6 and a collar 8 fixed by screws 9 within the sleeve 2. The ferrule 5 is of smaller diameter than the handle 1, and the spring 7 is coiled about the ferrule and designed to extend the handle and sleeve relatively one to the other. The handle of course is pushed downwardly in the sleeve against the tension of the spring 7 and the handle is guided by the pin 4 which passes through the handle and a portion of its ferrule.

The ferrule forms the functions of a holder for the auger or bit 10 which is tapered as shown in the drawings and its edges are provided with teeth or corrugations 11 for tearing to pieces or cutting through the plants or weeds to be destroyed. The lower end 12 of the sleeve 2 is provided with a transversely extending slot 13 through which the auger passes, and this slot imparts the rotary movement to the auger as the latter passes through the slot 13. The stem 14 of the auger is fashioned with an enlarged cylindrical bearing head 15 located in the lower end of the ferrule. The shank 16 above the head 15 is fashioned with a ball or spherical head 17 and this shank is retained within the resilient inturned arms or tongues 18 forming elements of the split tool holder.

It will be apparent in Fig. 2 that as the handle 1 is forced down against the tension of the spring 7 that the auger is passed through the slot 13 in the closed end of the sleeve 2. This passage of the auger blade through the slot causes a rotary movement or corkscrew movement of the auger, with the bearing head 15 and the spherical head 17 rotating in the tool holder. As the auger passes through the plant, it tears the roots to pieces, and as the pressure is relieved from the handle 1, the spring 7 lifts the handle and with it the auger 10. The auger is retained within the tool holder by means of the jaws 19 on the ends of the resilient arms 18, and in this manner the spherical head 17 is permitted to revolve in the jaws but is retained against longitudinal displacement. The removal of the torn roots from the soil is accomplished by the auger, and these torn parts are removed from the auger by the walls of the slot 13 in the bottom end of the sleeve 2.

Having thus fully described my invention, what I claim as new and desire to secure by Letters Patent is:—

1. In a weeding tool the combination with a sleeve and its telescoping handle, of a tool holder on the handle within the sleeve, an auger retained by the tool holder and rotatable therein, and means on the sleeve for rotating the auger as the handle is depressed.

2. The combination in a weeding implement with a sleeve having a closed end with a slot therein and a telescoping handle, of a tool holder on the handle, an auger adapted to be guided in the slotted end of the casing, and a shank on the auger having a rotatable bearing in said tool holder.

3. The combination with a sleeve having slotted side walls, of a handle having a guide pin therein and adapted to telescope in said sleeve, a collar fixed within the sleeve and a spring interposed between the collar and the lower end of the handle, a tool holder fixed to the handle comprising resilient arms and jaws, an auger adapted to coact with a slot in the lower end of the sleeve, and a shank on the auger rotatably supported in the tool holder.

In testimony whereof I affix my signature.

THEODORE GENTSCH.